United States Patent [19]

Bittner et al.

[11] Patent Number: 4,567,564
[45] Date of Patent: Jan. 28, 1986

[54] ARRANGEMENT FOR THE ATTITUDE STABILIZATION OF FLEXIBLE VEHICLES WITH WEAKLY-DAMPENED STRUCTURAL VIBRATIONS AND DISCONTINUOUS CONTROL INTERVENTION

[75] Inventors: Helmut Bittner, Munich; Eveline Gottzein, Oberpframmern; Michael Surauer, Chieming, all of Fed. Rep. of Germany

[73] Assignee: Messerschmitt-Bölkow-Blohm Gesellschaft mit beschränkter Haftung, Munich, Fed. Rep. of Germany

[21] Appl. No.: 275,359

[22] Filed: Jun. 19, 1981

[30] Foreign Application Priority Data

Aug. 19, 1980 [EP] European Pat. Off. ........ 80104916.4

[51] Int. Cl.$^4$ .............................................. B64G 1/20
[52] U.S. Cl. .................................... 364/434; 244/164
[58] Field of Search ............. 364/434; 244/3.15, 3.18, 244/3.2, 3.21, 3.23, 164–166, 169, 171, 176; 318/582, 584, 585, 586; 73/178 R

[56] References Cited

U.S. PATENT DOCUMENTS

| | | | |
|---|---|---|---|
| 3,866,025 | 2/1975 | Cavanagh | 364/434 |
| 3,984,071 | 10/1976 | Fleming | 364/434 |
| 3,998,409 | 12/1976 | Pistiner | 364/434 |
| 4,071,211 | 1/1978 | Muhlfelder et al. | 364/434 |
| 4,106,094 | 8/1978 | Land | 364/434 |
| 4,174,819 | 11/1979 | Brüderle et al. | 364/434 |
| 4,272,045 | 6/1981 | Phillips | 244/164 |
| 4,294,420 | 10/1981 | Broquet | 244/165 |

*Primary Examiner*—Gary Chin

*Attorney, Agent, or Firm*—Toren, McGeady, Stanger, Goldberg & Kiel

[57] ABSTRACT

An arrangement for the attitude stabilization of flexible vehicles, such as aircraft and spacecraft. Such vehicles, due to their lightweight construction and/or large spatial extension or high degree of slenderness, have structurally weakly-dampened bending vibrations and/or torsional vibrations. For generating the forces and moments required for stabilizing such vehicle, discontinuously operating units are used. In one embodiment, for each vehicle axis, an observer or Kalman filter is employed for obtaining estimated values of the state variables of the vehicle system to be controlled. The observer has a first transfer function of at most third order. A state controller device is responsive to the observer for controlling the state variables. A modulator network is responsive to the state controller device wherein the modulator network has a relay characteristic. In this embodiment, a feedback path is arranged from the output of the modulator network to the observer which eliminates the need for a special modulator network having a second transfer function and also eliminates internal modulator feedback. In another form of the invention, the feedback is arranged from the input of the modulator to the observer and a low pass filter is included between the state controller device and the modulator network. The filter has either at least two low pass filter sections of first order or a single low pass filter section of at least second order. The break-point frequencies of the filter section or sections lies between the natural frequency of the rigid body and the lower structural resident frequency of the respective vehicle axis. Equivalent circuits are disclosed for replacing the observer and state controller device as described above. Adaptive techniques as well as digital realizations of the various embodiments are also disclosed.

19 Claims, 13 Drawing Figures

ARRANGEMENT FOR THE ATTITUDE STABILIZATION OF FLEXIBLE VEHICLES WITH WEAKLY-DAMPENED STRUCTURAL VIBRATIONS AND DISCONTINUOUS CONTROL INTERVENTION

FIELD OF THE INVENTION

The invention relates to an arrangement for the attitude stabilization of flexible vehicles, such as aircraft and spacecraft which, due to their lightweight construction and/or large spatial extension or their high degree of slenderness, have structurally weakly-dampened bending and torsional vibrations and in which, for generating the forces and moments required for the stabilization, discontinuously operating actuators are used.

BACKGROUND OF THE PRESENT INVENTION

For the attitude stabilization of spacecraft, it is known to correct deviations from the desired attitude by means of jet impulses as soon as a predetermined permissible value of the control error is exceeded; in this regard, see U.S. Pat. No. 3,984,071.

In spacecraft which move in orbits around the earth, deviations from the desired attitude are usually measured by means of infrared horizon sensors (IRS), radio frequency sensors or sun sensors. In special cases, such as, for example, in scientific or earth reconnaissance satellites, gyroscopes and star sensors are also used.

Depending on the type of application, the reaction engines which are used can either be cold gas engines, for example, nitrogen from pressure reservoirs, or chemical engines, for example, hydrazine with catalytic decomposition, or bipropellant systems with fuel and oxidator.

For converting the substantially continuous deviation into appropriate pulse-shaped signals for the moments about the axes of the vehicle, conventionally so-called "pseudorate" or "pulse width pulse frequency" (PWPF) modulators are used. The corresponding control networks consist of lag filters for suppressing the sensor noise in the case of the pseudorate modulator or of proportional-differential (PD) units with filters in the case of the PWPF modulator, see, for example, J. E. Vaeth: "Compatibility of Impulse Modulation Techniques with Attitude Sensor Noise and Spacecraft Maneuvering", IEEE Transactions on Automatic Control, January 1965, pages 67 ff.

Both control configurations are well suited for the stabilization of vehicles, particularly satellites, whose construction does not permit any significant structural-elastic deformations, such as bending vibrations and torsional vibrations.

With the increasing spatial extension of such vehicles, their high degrees of slenderness in certain axial directions and their lightweight construction, such structural vibrations, which, naturally, also have very weak internal damping, are unavoidable and are of decisive importance for the dynamics.

For example, in three-axis stabilized communications satellites, the electrical energy for the devices used aboard and the payload for communications is usually generated by two-oppositely arranged solar generators which can be unfolded and conventionally have a width of 1 to 2 m, but can have a length of 5 to 20 and more meters in the unfolded state, while having a thickness of only a few centimeters. The frequencies of the lower-most natural bending and torsional natural vibrations of such structures are in the order of magnitude of 0.1 to 2 Hz, i.e., in a frequency range in which during certain disturbance torque conditions the above-mentioned modulators are also operating which causes the excitation of structural vibrations. The frequencies of the pure rigid body motions are generally about one order of magnitude lower than those of the structural vibrations.

By means of the controller concept of the conventional type, it is very difficult and, with increasing size of the spacecraft, even impossible to meet the partially contradicting requirements for accuracy of pointing satisfactory rigid body dynamics and simultaneous active structural vibration damping. The adjustable parameters of the regular system are partially fixed from the outset or severely limited in their selection by the requirements or physical properties of the components; for example:

the controller amplification by the required attitude accuracy at a given maximum disturbance torque;

the magnitude of the minimum jet pulse (thrust × nozzle opening time) by the delay of the valves and/or the physics of the combustion process;

the maximum number of jet activations over the service life (of, e.g., 7 to 10 years) by reliability requirements (wear, aging);

conditions of the controller time lead-lag ratio filter time constant) by the signal/noise ratio of the sensors.

In the past, it was still possible in part, in spacecraft having a predominantly rigid structure or only one dominant form of bending vibrations, to find an acceptable compromise in the selection of the adjustment parameters of the control system of the above-mentioned configurations: see, for example, AIAA Paper No. 76-266 "Attitude Stability of Flexible Spacecraft Which Use Dual Time Constant Feedback Network Pseudorate Control", 6th Communications Satellite Systems Conference, Montreal, Apr. 5-8, 1976. This has become impossible to an increasing extent because of the accuracy requirements which require the controller amplification to be further increased. Also, due to the structures becoming larger and, therefore, "softer", several forms of bending vibrations of various natural frequency for each vehicle axis must be taken into consideration and stabilized.

Under these conditions, employing stabilization concepts of conventional configuration, even with the best possible selection of the adjustable parameters, instabilities or at least non-linear vibrations, so-called limit cycles, are created which lead to an actuation of the reaction jets in the rhythm of the natural frequencies of structural vibrations and result in an unduly high fuel consumption and in structural stresses which may endanger the mission.

The objective of the present invention consists in specifying improved arrangements for the attitude stabilization of flexible vehicles, such as aircraft and spacecraft, which exhibit one or several weakly damped structural vibrations at different harmonic frequencies, and in which discontinuously operating actuators are used, like for instance reaction jets or gimballed momentum wheels with steplike positioning of the gimbals to produce control torques.

In other words the improvement aims at a considerable increase of the attitude accuracy simultaneously mastering the structural oscillation problems. To achieve this goal novel control concepts are required, which provide a sufficiently large number of degrees of freedom for control, which are largely independent from each other and can be freely selected in order to meet the various control requirements simultaneously.

This task is solved by an observer of at most third order per vehicle axis, a state regulator, and a modulator loop with relay characteristics, where, according to one preferred embodiment of the invention, the modulator loop does not imply a separate modulator network and internal feedback, but the feedback path from the modulator output into the observer additionally provides the function of these two modulator elements.

Advantage of the invention can be taken in all control systems where the characteristic features of resonance properties of the control plant at particular natural frequencies and discontinuously operating actuators apply. This is the case for instance in slender, i.e. flexible rockets and missiles moving in the earth athmosphere, implying discontinuous rudder control and in launch vehicles, particularly upper stages of these, as well as in magnetically levitated and guided vehicles of elastic construction or respectively with elastic suspension of levitation and guidance magnets, which move along elastically deformable rails, and in which discontinuously operating magnet current drivers are used.

Instead of reaction jets in spacecraft and satellites, it is also possible to use, for example, momentum wheels with single or double cardanic mounting and with step positioning of the frame or housings, or so-called "control moment gyros" and the like.

SUMMARY OF THE INVENTION

In accordance with the invention, in an arrangement for the attitude stabilization of flexible vehicles, such as aircraft and spacecraft, which, due to their lightweight construction and/or large spatial extension or their high degree of slenderness, have structurally weakly-dampened, bending vibrations and/or torsional vibrations and in which, for generating the forces and moments required for stabilization of the vehicle, discontinuously operating actuators are utilized, the improvement comprising that, for each vehicle axis, there are observer means, state controller means, modulator network means and feedback means. The observer means, respresenting a Kalman type filter, is for obtaining estimated values of the state variables of the vehicle system to be controlled. The observer means have a first transfer function of at most third order. The state controller means are responsive to the observer means and are for controlling the state variables. The modulator network means, are responsive to the state controller means, and have a relay characteristic. Finally, the feedback means are disposed from the output of the modulator network means to the observer means. The feedback means eliminate the need for a special modulator network having a second transfer function and an internal modulator feedback.

In another form of the invention, in such an arrangement for the attitude stabilization of flexible vehicles, there exists, for each axis, observer means, state controller means, modulator network means and feedback means. In this embodiment, the feedback means are disposed from the input of the modulator network means to the observer means. Also included is a low pass filter between the state controller means and the modulator network means, the filter having either at least two low pass filter sections with first order transfer functions or a single low pass filter section with at least a second order transfer function, the break point frequencies of the first order transfer functions and second order transfer functions being between the natural frequency of the rigid body and the lowest structural resonance frequency of the respective vehicle axis.

In a still further form of the invention, the observer means of the above two embodiments and state controller are replaced by equivalent networks in the controller means and modulator network means so that the equivalent networks provide the identical and corresponding function as the observer means and state controller means in the above embodiments.

For a better understanding of the present invention, reference is made to the following description and accompanying drawings, while the scope of the present invention will be pointed out by the appended claims.

BRIEF DESCRIPTION OF THE DRAWINGS

In the drawings:

FIG. 5b shows a control circuit with networks equivalent to the observer/state controller according to FIG. 5a;

DESCRIPTION OF THE PREFERRED EMBODIMENTS

Figure 1:
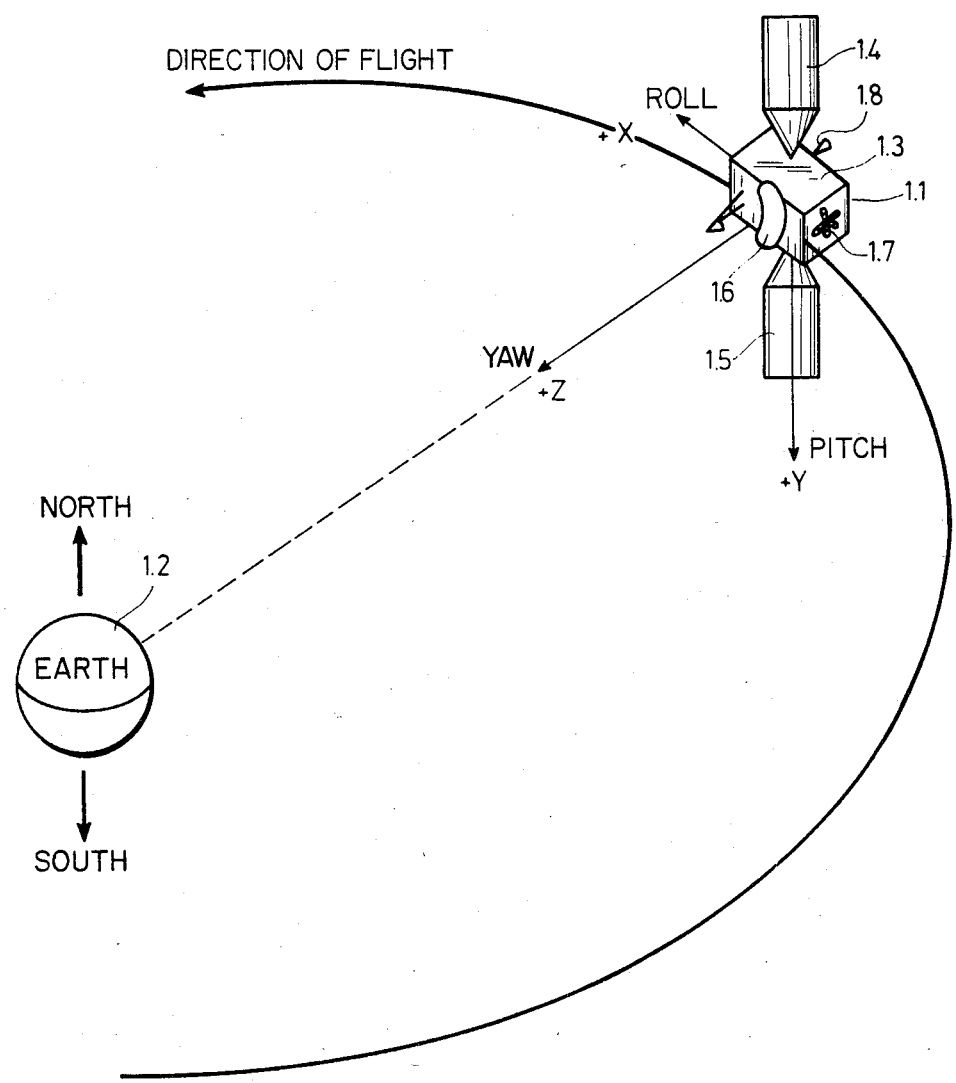
FIG. 1 shows a geostationary spacecraft on its orbit.

FIG. 1 shows, very simplified, the typical geometric configuration of a geostationary communications satellite 1.1 on its orbit around the earth 1.2. The spacecraft 1.1 is composed of a cube-shaped central body 1.3 in which large-area, bending-elastic solar generators 1.4 and 1.5 are rotatably supported and which carries one or more antennae 1.6 which are directed toward the earth 1.2 and whose direction of radiation are to be maintained within predetermined, narrow limits by means of the control system of the spacecraft 1.1. An axis system x (roll axis), y (pitch axis), z (yaw axis) is assigned to the spacecraft 1.1 in such a way that, in the case of ideal function of the control system, the roll axis points in the momentary flight direction, the yaw axis toward the center of the earth and the pitch axis in the direction of the orbit normal. Reaction jets 1.7 and 1.8 which are arranged on different sides and are illustrated only schematically and inasmuch as they are visible in this illustration, serve for the generation of torques about these axes and for generating forces along the roll and pitch axes.

During normal operation of the spacecraft 1.1, particularly due to solar pressure, residual magnetism of the spacecraft 1.1, in interaction with the magnetic field of the earth, and inhomogeneities of the gravitational field of the earth 1.2, interference forces and disturbance torques occur which cause the spacecraft 1.1 to move from its desired position in the orbit and the directions of the axes from their respective desired pointing directions; this must be prevented by the intervention of the control system. The restoration of the desired position is effected by means of so-called orbit correction maneuvers, i.e., actuation of the reaction nozzles 1.7, which point in the x or y direction and whose thrusts, due to deviations of the center of gravity of the spacecraft from its ideal position, simultaneously result in high disturbance torques about the spacecraft axes. These disturbance torques are compensated by short-duration jet impulses from the reaction jets 1.7, 1.8 which generate the torques; this results in the excitation of structural vibration. The impulse duration and the pulse repetition frequency depend on the magnitude of the occurring disturbance torques, the thrust level, the lever arm and the design parameters of the pulse modulators used. In the case of certain, so-called critical disturbance torques, the pulse repetition frequency coincides with the natural frequencies of the elastic structural vibrations or the subharmonic thereof, which creates stability problems which are especially difficult to control. In accordance with the principle that the control engineering effort for meeting the respective control task must be kept as low as possible for reasons of weight reduction and high reliability, various embodiments shall be described, and the limits of their applications are indicated and additional measures for expanding their applications are given.

The novel devices for the attitude stabilization initially start from the assumption that the above-mentioned, known control concepts which are based on the use of pseudorate or PWPF modulators for generating the control pulses can be standardized, so that, in the description of the invention, it is not necessary to distinguish the embodiments depending on the method of modulation.

Figure 2A:
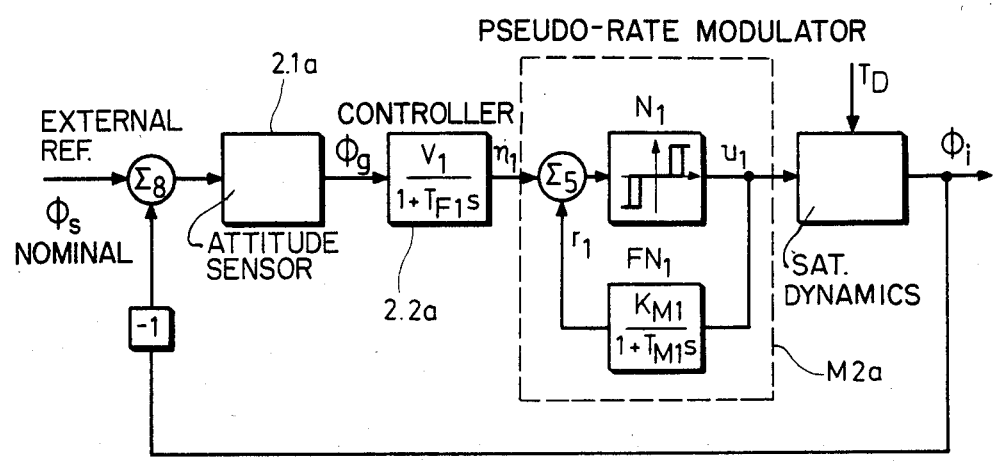
FIGS. 2a, 2b show control loops in accordance with the state of the art.
Figure 2B:
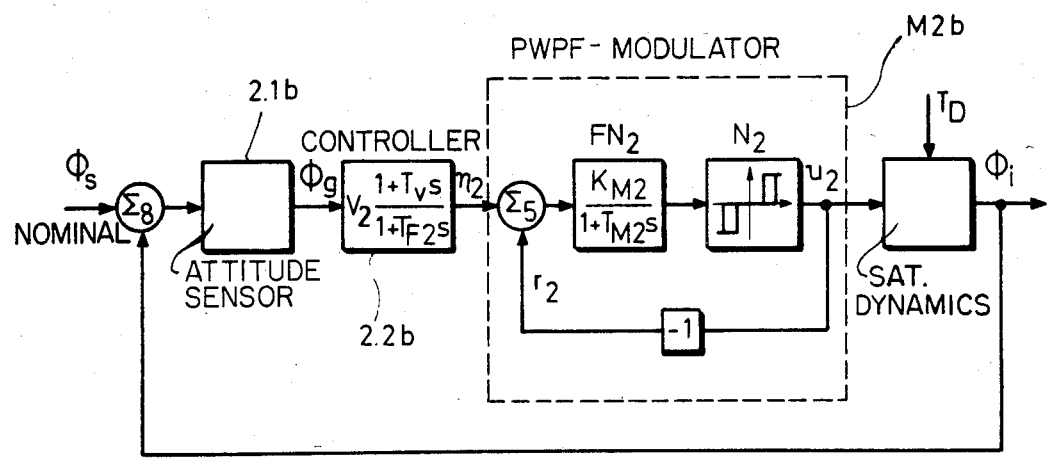

FIG. 2a shows a typical pseudorate control circuit and FIG. 2b shows a control circuit with PWPF modulator of the conventional type for the control of the spacecraft about the rotary axis whose rotary motion is denoted by $\phi$ in this case and which is used as an example for the roll axis, pitch axis or yaw axis. The angular deviation relative to an external (earth, sun, star) or internal (gyro) reference is detected by means of an attitude sensor 2.1a, 2.1b whose measurement signal $\phi_g$ is supplied to a controller network 2.2a, 2.2b, which, in the case of FIG. 2a, consists of an amplification $V_1$ and a lag filter with a time constant $T_F$, and, in the case of FIG. 2b, of an amplification $V_2$ and a lead unit with lead $T_V$ and lag time constant $T_F$. The control signals $\eta_1$, $\eta_2$ generated by the controller 2.2a, 2.2b are supplied to the inputs of modulators-pseudorate M2a or PWPF M2b which generate pulse-shaped output signals $U_1$, $U_2$ from the continuous input signals $\eta_1$, $\eta_2$. The modulators M2a, M2b each contain a element $N_1$, $N_2$ with typical relay characteristic, an internal feedback $v_1$, $v_2$ and a modulator network FN1, FN2, composed of amplification $K_{M1}$, $K_{M2}$ and a lag unit with time constant $T_{M1}$, $T_{M2}$ which, in the pseudorate modulator, is in the feedback path, however, in the PWPF modulator, is in the forward path of the modulator. The pulse-shaped modulator output signals $U_1$, $U_2$ actuate, i.e., open and close, the valves of reaction jets whose thrust moments influence the dynamic movement of the vehicle in such a way that the actual attitude $\phi_i$ and the desired attitude $\phi_s$ coincide to the extent permitted by external disturbance torques $T_D$ and the achievable control accuracy.

Figure 2C:
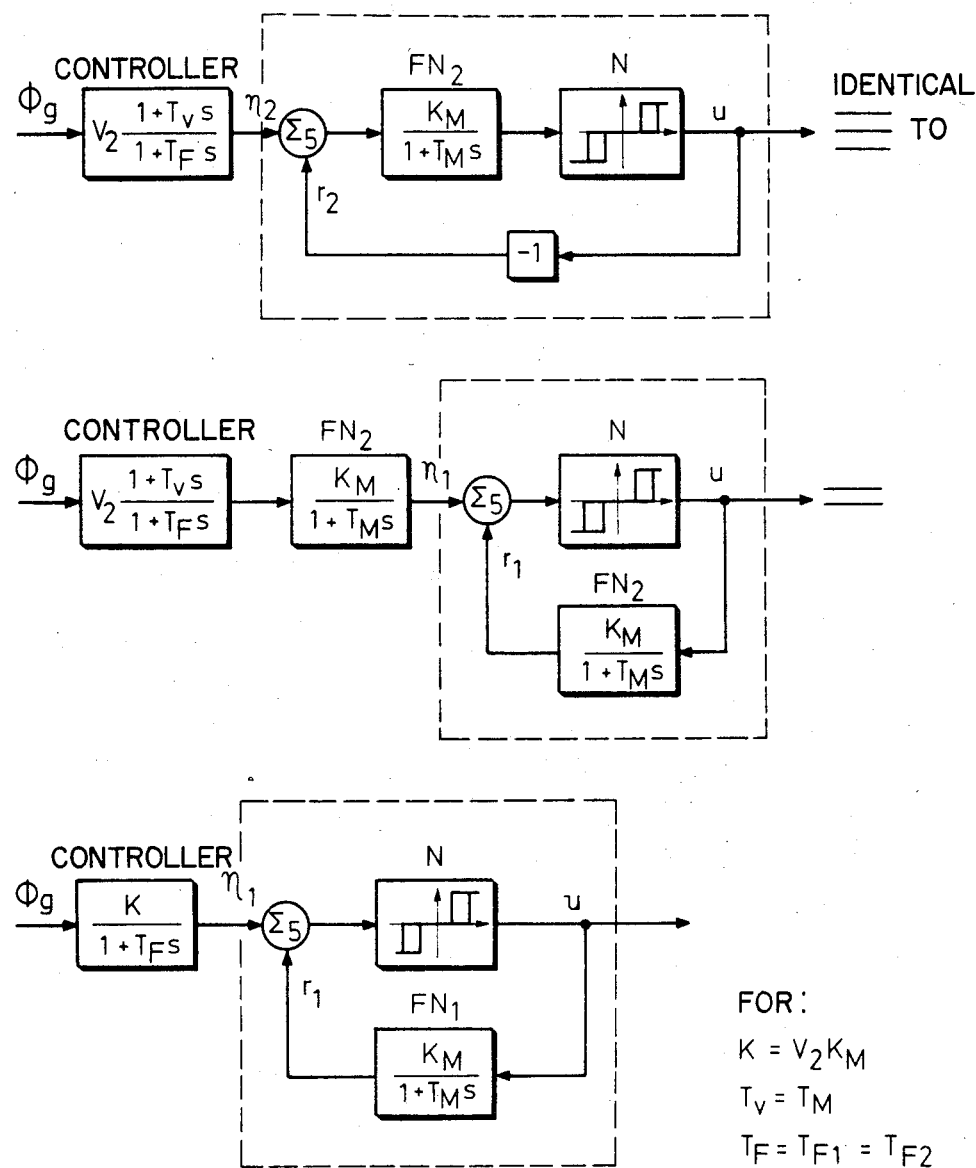
FIG. 2c shows the joining of the loops of FIGS. 2a, 2b.

FIG. 2c shows how these two control circuits from FIGS. 2a, 2b, which in the literature had heretofore always been treated completely separately, can be joined together. If the modulator network FN2 in the PWPF modulator circuit M2b according to FIG. 2 is shifted forwardly beyond the summation point at the modulator input, which corresponds to a simple and permissible linear conversion, the modulator network FN2 occurs behind the controller as well as in the feedback path of the modulator for ensuring the same signal conditions at the input of the non-linear element N. If the controller transfer function and the modulator network are combined and $V_2 K_{M2} = V_1$, $T_\nu = T_{M2} = T_{M1}$, $K_{M2} = K_{M1}$ and $T_{F2} = T_{F1}$ are selected, the term of the numerator of the lead unit and the lag unit of the modulator network can be cancelled and exactly the pseudorate control circuit according to FIG. 2a is obtained.

Accordingly, the control circuit with pseudorate modulator and single lag unit for noise suppression as the controller network is a special case of the control circuit with lead-lag unit and PWPF modulator for the same values of the lead and modulator time constants ($T_\nu = T_{M2}$).

From these considerations, it follows simultaneously that the control circuit according to FIG. 2b has one degree of freedom of adjustment more than the pseudorate control circuit according to FIG. 2a, i.e., the lead time constant $T_\nu$.

Therefore, the following descriptions of embodiments of the invention apply to both types of control circuits and/or modulation methods, even if this is not especially mentioned in the individual case, because, when knowing of the above-described relationships, such transformations which are connected with the change of the modulator structure from PWPF to pseudorate and vice-versa are known to a person of ordinary skill in this art and do not pose any difficulties. Furthermore, every such person of ordinary skill knows that the equivalency of control circuit structures is not maintained when linear elements, such as transfer functions, summation points, branching points and the like, are shifted beyond a non-linear unit, such as, for example, the relay characteristic N in FIGS. 2a and 2b, because, in this case, the superposition principle for the signals no longer applies and, as a result, completely different conditions occur which can no longer be easily controlled. However, essential components of the invention described hereinbelow are based exactly on such measures.

The considerations which have led to the present invention can be explained most clearly by initially starting from the principle of a so-called observer which is known per se, by means of which estimated values of the state variables of the system to be controlled are generated for obtaining feedback signals for the control from an electrical model of the controlled system.

Figure 3:
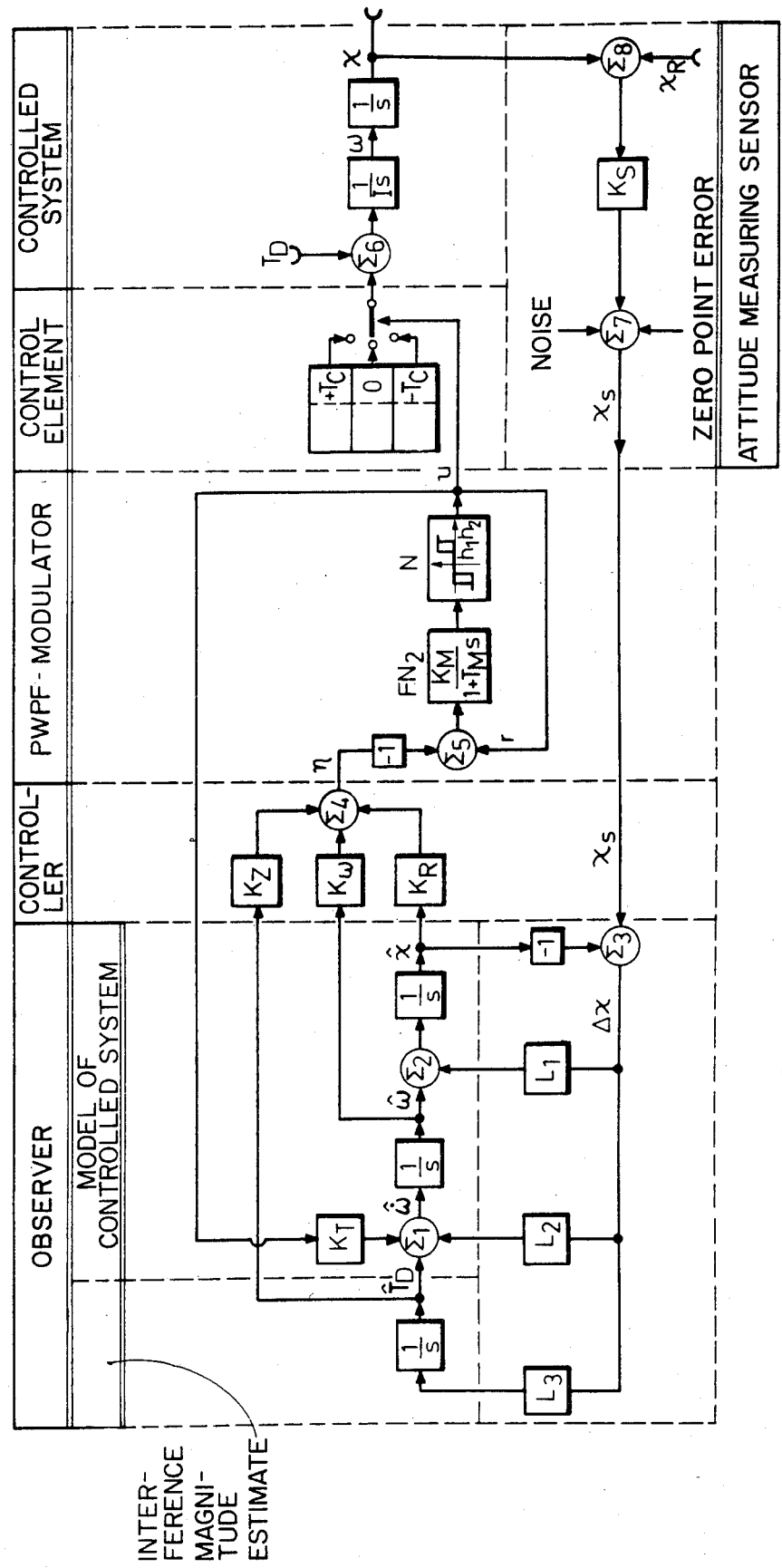
FIG. 3 shows a block diagram of a rigid body control system with observer, state controller and PWPF modulator.

The observer theory was stated by Kalman and Bucy in the years 1960/61 and is described in the two fundamental publications, Transactions of the ASME, Journal of Basic Engineering, March 1960, pages 35 to 45 and March 1961, pages 95 to 108, and in many subsequent works and textbooks. An application of this principle for the control of a spacecraft of rigid, i.e., non-flexible structure, can be found, for example, in the Preprints of the 8th IFAC Symposium on Automatic Control in Space, July 2–6, 1979, Oxford, England, pages 147 to 157 (S. J. Dodds: An Adaptive, High Precision, Gas Jet Satellite Attitude Control System for Mircroprocessor Implementation). FIG. 3 shows the configuration of a control system for the stabilization of the rotational motions of a rigid satellite about a principal axis of inertia in a slightly different form, the difference essentially residing in the use of a conventional PWPF modulator instead of a computer program for generating the control signals for the reaction jets. This configuration shall now be briefly explained in order to clarify the embodiments of the present invention to be described later.

The control loop is composed (from right to left as seen in FIG. 3) of the controlled system, the actuator, a PWPF modulator for its control, the controller and an observer, and a measuring unit for determining the deviation. The rotational motion of a rigid body is described by a dynamic model consisting of two integrators connected in series which, in FIG. 3, are illustrated by their transfer functions $1/s$ with the Laplacian operator s. The observer contains a corresponding electrical model of the controlled system for the formation of estimated values $\hat{\omega}$, $\hat{\chi}$ of the rotational speed $\omega$ and of the angle of rotation $\chi$. The difference $\Sigma_3$ between the estimated $\hat{\chi}$ and the measured angular position $\chi_s$ is used for correcting the observer model of the controlled system, i.e., to follow it up to the system to be controlled. The mixing factors $L_1$, $L_2$ for correcting the estimated values are selected in an optimum manner in accordance with the rules of the observer theory in the sense of the smallest quadratic deviations of the estimated state variables from the actual state variables and the best possible suppression of the sensor noise.

Aside from the above-mentioned correction signal, to the input of the system model in the observer there are additionally supplied over the mixing factor $(K_t)$ from the output of the PWPF modulator, the pulse-shaped electrical control signals for the reaction jets which represent an image of the control signals for the controlled system as accurately as possible and have the effect that the signals in the observer $\hat{\omega}$, $\hat{\chi}$ behave an any time like the actual state variables $\omega$, $\chi$.

The observer according to FIG. 3 is expanded compared to the actual controlled system by one order, i.e, an additional integrator $1/s$, which has the purpose of generating an estimated value $\hat{T}_D$ for the unknown disturbance torque $T_D$ which is assumed constant and acts from outside on the controlled system. The estimated values $\hat{\omega}$, $\hat{\chi}$, $\hat{T}_D$ obtained in the expanded observer for the state variables $\omega$, $\chi$ and the disturbance $T_D$ acting on the system to be controlled are combined in the controller with suitable amplification factors $K_R$, $K_\omega$, $K_z$ to a control variable $\eta$ and are supplied with the reversed sign to the input of the modulator which generates positive or negative control pulses u for controlling the engine valves from the continuous input signal $\eta$ depending on the sign of the latter. The engines are switched on and off in the rhythm of these pulses and, thus, pulse-shaped control moments $T_c$ of the corresponding sign are created which impart rotational accelerations to the vehicle (controlled system) and effect its attitude stabilization.

The split of the control engineering measures for the stabilization made in FIG. 3 into observer and controller corresponds to the principles of modern control theory, wherein the observer has the purpose of producing estimated values $\hat{\omega}$, $\hat{\chi}$, $\hat{T}_D$ of quantities, which can either not be measured directly at all $(T_D)$ or only with additional devices, such as, for example, rate gyros $\omega$, and the controller constitutes a so-called state controller because it forms linear combinations of state variables $\omega$, $\chi$, $T_D$ characterizing the system to be controlled. However, both parts must be realized by way of devices for meeting the control task and, therefore, must be considered an entirety, when making comparisons, for example, with the controller networks of the classical concepts of FIGS. 2a and 2b.

Following the above explanation of the factual situation and the description of the state of the art with the aid of the simple example of the control of a rigid spacecraft, the invention shall now be discussed in more detail. As already mentioned above, the concepts according to FIG. 2 and FIG. 3 are not suitable for the attitude stabilization of flexible vehicles which, due to their light weight, weight-saving construction and/or great spatial extension, have weakly-dampened, structural bending vibrations and torsional vibrations because these vibrations can be easily excited, particularly when the control interventions are not smooth and continuous but are, as in the above examples, sudden or pulse-like, i.e., discontinuous.

Figure 4A:
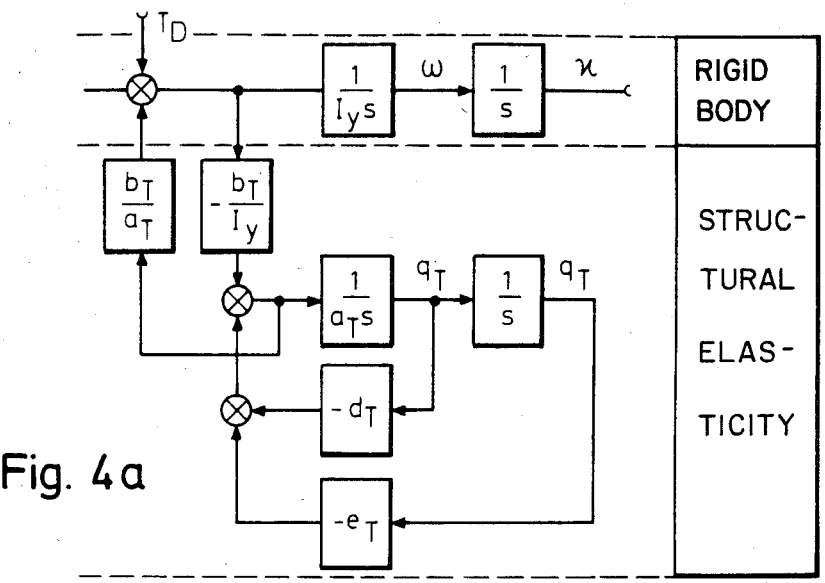
FIG. 4a shows a dynamic model of a flexible vehicle.

FIG. 4a shows the dynamic model of a flexible vehicle for one degree of freedom of movement consisting of rigid body dynamics and structural elasticity. The rigid body dynamics is identical to the controlled system illustrated in FIG. 3. The moments acting on the rigid body also influence, through coupling coefficients $b_T$ the elastic form of structural vibrations $9_T$, which is described by generalized mass $a_T$ of the structural parts capable of vibration, a generalized stiffness $e_T$ and the structural self-damping $d_T$ and reacts back upon the rigid body. The same model structure applies for translatory forms of movement when moments are imagined as being replaced by forces and rotational movement values are imagined as being replaced by translatory movement values.

For simplicity's sake, FIG. 4a shows only a single form of natural vibration; however, in reality, usually a plurality of these forms occur simultaneously with different parameters and corresponding resonant frequencies.

Figure 4B:
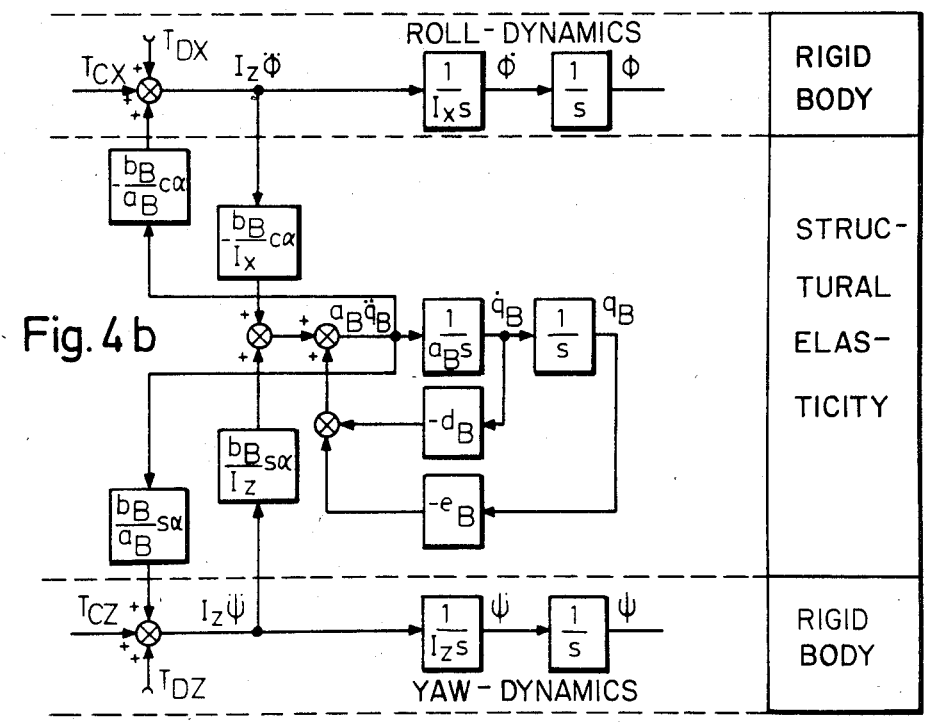
FIG. 4b shows a dynamic model of the coupled roll/yaw motion of a flexible spacecraft.

As another example, FIG. 4b shows the dynamic model for the roll/yaw movement of a spacecraft with elastic solar generators. Again for simplicity's sake, only a single elasticity model is shown which is used in representative fashion for several forms of vibration which are to be imagined connected parallel thereto, the model being excited by the movements in both axes and also reacting upon them. Moreover, this interaction depends upon the angle $\alpha$ of rotation of the solar generators in the spacecraft and changes periodically with each orbit of the spacecraft around the earth, because the solar generators must always be directed toward the sun and, thus, remain fixed in space, however, the antennas are always directed toward the earth and, therefore, the spacecraft must rotate once during each orbit about its vertical or pitch axis.

The conditions are additionally made more difficult by the fact that, aside from the types of vibration indicated in FIG. 4b for normal bending (subscript B), several so-called in-plane bending vibration types occur simultaneously in the spacecraft in the spatially perpendicular direction of the former vibration; with the same model structure, these in-plane bending vibrations differ only with respect to the coupling to the rigid body motions and, of course, have different resonant frequencies.

To take into account the conditions described with the aid of FIGS. 4a, 4b in the design of controlled systems for flexible vehicles, we shall now imagine the simple rigid body model of the controlled system of FIG. 3 replaced by the corresponding dynamic model according to FIG. 4a and additionally supplemented by further natural vibration forms with appropriate model parameters $a_i$, $b_i$, $d_i$, $e_i$; $i=1, 2, 3 \ldots$ To take into account the different dynamic behavior of the system to be controlled, the observation theory prescribes that the system model in the observer must also be expanded appropriately and, thus, adjusted to the actual conditions, so that the observer can provide acceptable estimated values for the state variables.

In principle, it seems possible to thereby solve the task of controlling the rigid body motions and of damping the structural vibrations, however, the measures for expanding the models in the observer part of the controller electronics are significantly more complicated. Especially the predictions of the elastic natural vibrations to be expected, which predictions are based on structural dynamic computations, are subject to significant uncertainty; this practically destroys the operativeness of observer and controller concepts based on these predictions. This is because structural vibration models constitute almost undampened resonsant circuits which naturally have extreme amplification peaks in the resonant frequency and, therefore, are extremely sensitive to deviations of the parameters which describe them. With typical uncertainties of ±20% in the prediction of the natural frequencies and damping measures of $d=0.005$ of such structural vibrations, corresponding observer models and control systems including the models are not useful in practice.

This is where the invention starts which is based on the task of providing arrangements for the stabilization of flexible vehicles which meet the requirements for high control accuracy, are as inexpensive as possible to realize, are distinguished by a high insensitivity to changes of the parameters which are specific to the system, particularly the elasticity parameters, have a high efficiency in the consumption of control energy, and which control the dynamic problems of flexible vehicles, particularly when discontinuously operating control elements are used.

As already mentioned, for a better understanding of the invention, in the following description of various embodiments of the invention, in each case reference will be made to the known principle of a state controller with observer and PWPF modulator according to FIG. 3, although, as shall be demonstrated later, the controllers according to the invention can be converted to equivalent transfer functions from which the observer/state controller structure is no longer readily apparent. The operativeness of the various controller concepts in accordance with the invention and their effectiveness for solving the task of the invention were checked by simulations of electronic computers.

Figure 5A:
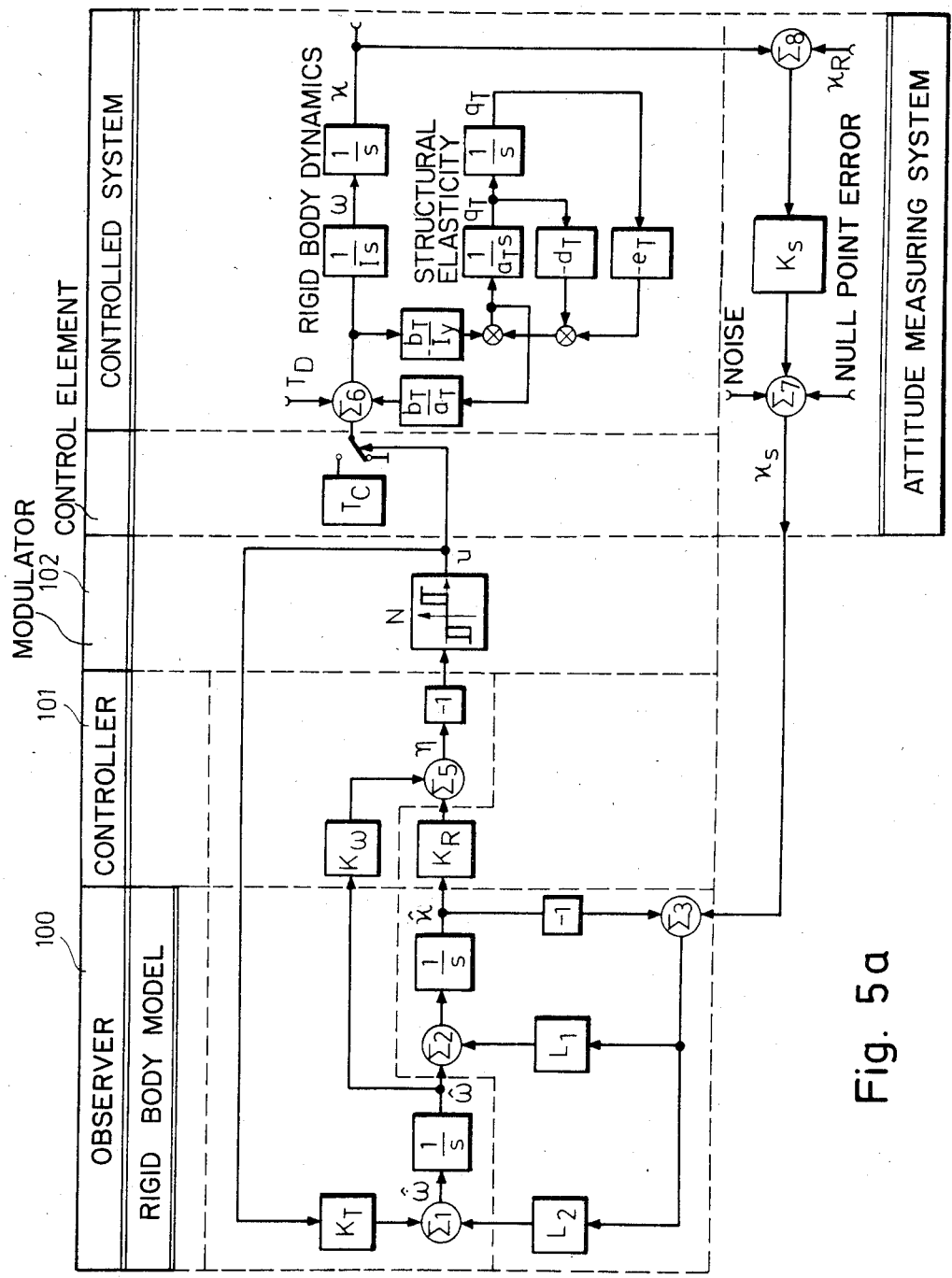
FIG. 5a shows a first control circuit in accordance with the invention.

FIG. 5a shows a first and simplest embodiment of a control circuit in accordance with the invention. It is composed of an observer 100 of minimum order, i.e., second order, which merely represents a model of the rigid body dynamics without structural elasticity and estimation of disturbance torque, a controller 101 with the mixing factors $K_\omega$, $K_R$, for the estimated angular velocity $\hat{\omega}$ and angular position $\hat{\chi}$ and the non-linear elements of the modulator 102 (relay characteristic N) in the signal linkage or combination shown in the block diagram according to FIG. 5a. Compared to the modulator according to FIG. 3, modulator network FN2 and internal feedback r are lacking in FIG. 5a, because in this arrangement, the function of these two modulator elements is assumed by the feedback circuit of the output u of the non-linear element N through the feedback factor $K_T$, the first integrator 1/s in the observer 100 and the mixing factor $K_\omega$. This controller is able to meet the requirements made inspite of the simplifications which have been effected, i.e., the fact that the modulator network and internal modulator feedback have not been used, and in spite of no simulation of the structural elasticity in the observer. It has been found that, in connection with the above-mentioned substitute feedback, the relay characteristics behave as a pseudorate modulator with a monitoring network of an order higher than the first order (namely, first order in the numerator and second order in the denominator instead of zero order in the numerator and first order in the denominator as in FN1 in FIG. 2a), and that, therefore, it shows a different dynamic behavior at low frequencies, such as the rigid body motions, than in the high frequencies of the structural vibrations. With the suitable selection of the adjustment parameters ($K_T$, $K_R$, $K_\omega$, $L_1$, $L_2$), this circumstance facilitates the simultaneous control of all occurring types of vibration with the lowest possible expenses for realization and a high insensitivity to changes of the system parameters. For describing the control circuit according to FIG. 5a, it shall be further mentioned that control element, position measuring element and controlled system coincide with the corresponding components of FIGS. 3 and 4a and, therefore, reference is made to the explanations given with respect to these figures.

As already mentioned, the linear components of observer/state controller structures can be converted, through simple conversions which are known to every expert, into completely equivalent transfer functions which can then be realized by appropriate electric networks 103. As an example, such a conversion was performed for the controller and observer according to FIG. 5a and the appropriate control circuit was illustrated in the functional block diagram of FIG. 5b, with the indication of the resulting transfer functions. As can be seen from FIG. 5b, a transfer function of the same type, namely, of the first order in the numerator and of the second order in the denominator, is obtained for the equivalent controller network and the modulator feedback. The denotations for parameters and coefficients according to FIG. 5a were maintained in the transfer functions according to FIG. 5b for reasons of clarity, although, in the case of practical application, new variables will be introduced for the new products and/or sums of the parameters.

Figure 5B:
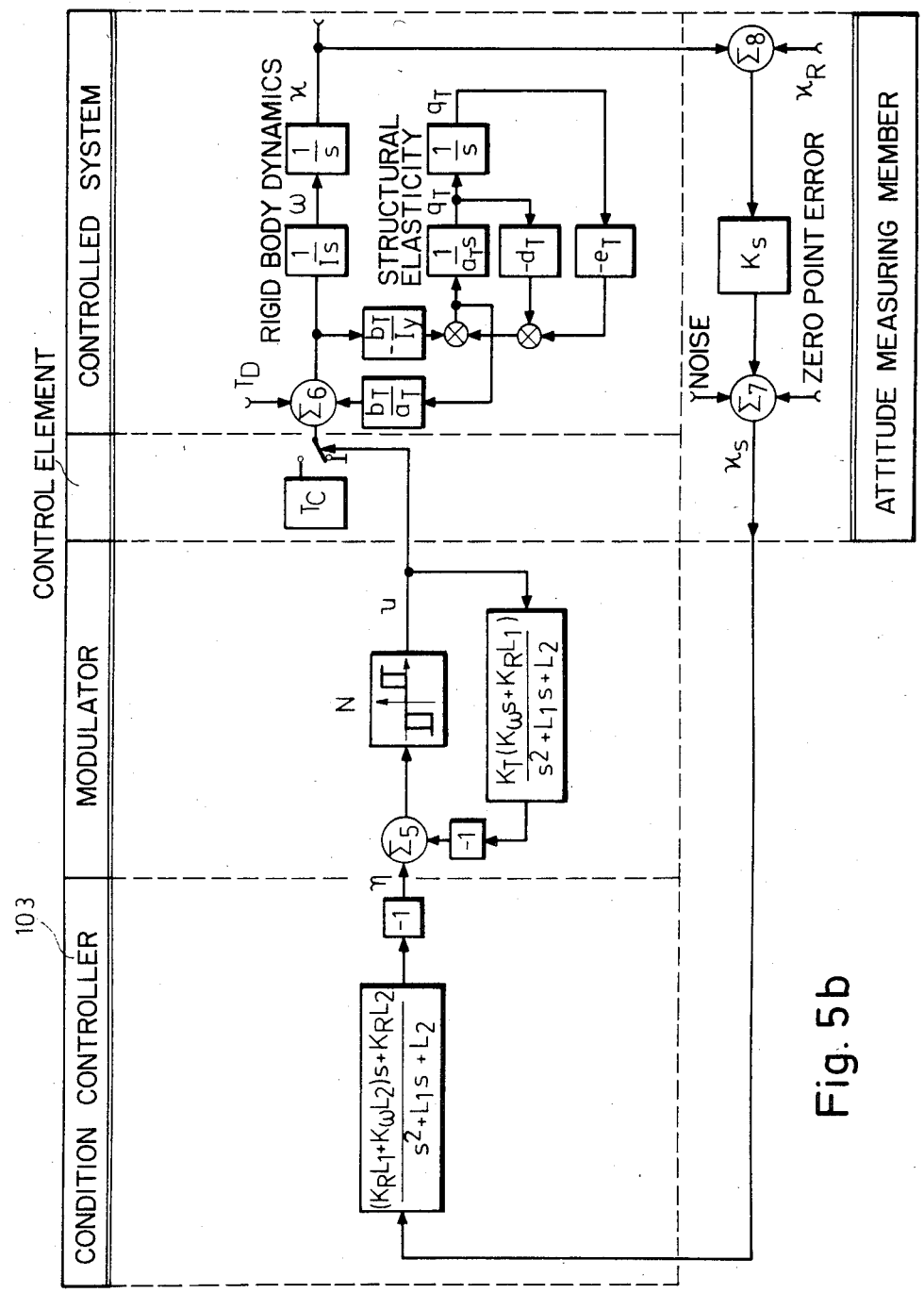

Concerning the technical realization of the control circuit elements, such as amplifiers, integrators, summing elements, relay characteristics and transfer functions according to FIGS. 5a and 5b, for example, as electrical networks with operational amplifiers, reference is made to pertinent textbooks, such as, J. G. Truxal "Control Engineers Handbook", McGraw-Hill, 1958.

If, in a special application, the disturbance torques acting on the system are very large and the requirements for the accuracy of alignment are very high, for maintaining the requirements of accuracy in the controller according to FIG. 5a, the mixing factor $K_R$ for the angular position $\hat{\chi}$ must be raised and, for maintaining a given damping of the dynamic movements, also the mixing factor $K_\omega$ for the velocity $\hat{\omega}$ must be raised accordingly. If the disturbance torques, which are the basis for the design of the control circuits, i.e., the selection of the regulator parameters $K_R$, $K_\omega$, do not occur in the actual operation of the system—this is true, for example, prior to the beginning and after the conclusion of the above-mentioned orbit correction maneuver of geostationary spacecraft—or if the disturbance torques are significantly lower than expected, then it is possible because of high control circuit amplification that undesired actuation of the reaction nozzles will be effected by the peaks of the measurement noise which is superimposed over the information signals.

Figure 5C:
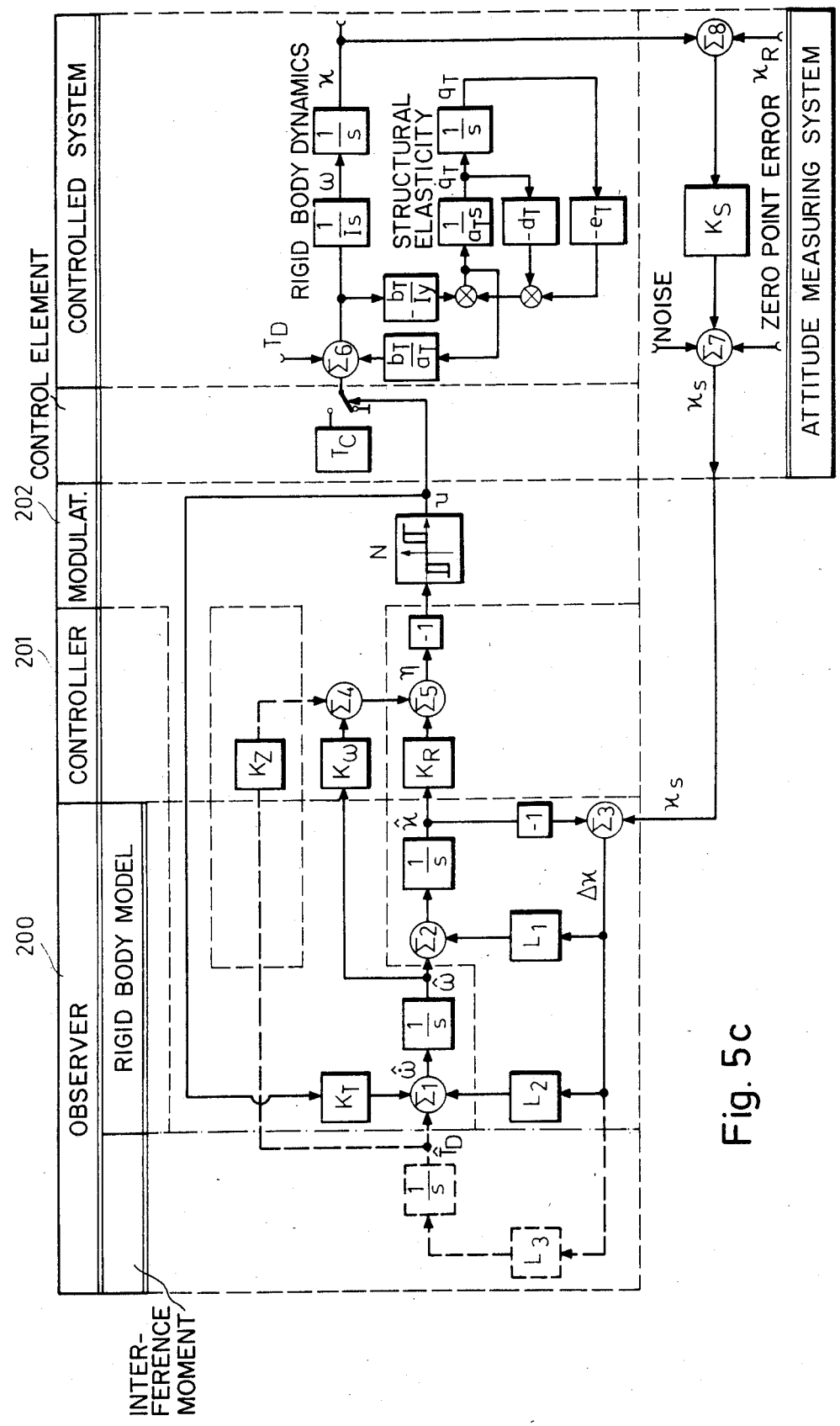
FIG. 5c shows a control circuit with expanded observer/state controller for disturbance estimation and compensation.

In accordance with another embodiment of the invention, it is advisable in such cases to expand observer and controller in accordance with FIG. 5a, i.e., to introduce, in a manner known per se, a disturbance estimation and compensation. FIG. 5c shows the expanded control circuit. Already discussed in connection with the description of FIG. 3 was the expansion made compared to the control circuit according to FIG. 5a of the observer 200 by an integrator 1/s and the feedback of the estimation error $\Delta\chi = \chi_s - \hat{\chi}$ through an amplification factor $L_3$ as well as the expansion of the controller 201 by a disturbance mixing factor $K_z$. The disturbance compensation has the effect that, aside from slight dynamic variations, no permanent deviations occur on the average in the stationary condition, i.e., the steady-state condition of the control circuit, so that the controller amplification factors $K_R$, $K_\omega$ can be reduced and, thus, the sensitivity to noise is reduced. It is found that, aside from a somewhat slower transient behavior, the controller in accordance with the invention is otherwise not negatively influenced by these additional measures. Of course, also for the expanded observer/state controller, it is possible to convert the network structure into equivalent transfer functions in accordance with the transition from FIG. 5a to FIG. 5b. This conversion is also known to one of ordinary skill.

The solution of the above stated control task can also be effected in a somewhat different manner than described with respect to FIGS. 5a and 5c. Such possibilities shall be explained in the following in connection with additional embodiments of the invention. The starting point for this is the configuration of the rigid body control system with observer, state controller and PWPF modulator in accordance with FIG. 3, wherein the controlled system is replaced by one having structurally elastic properties in accordance with FIG. 4a.

As already mentioned, such a control circuit is not suitable without significant changes for controlling the structural vibration problems and simultaneously meeting the other requirements.

Figure 6:
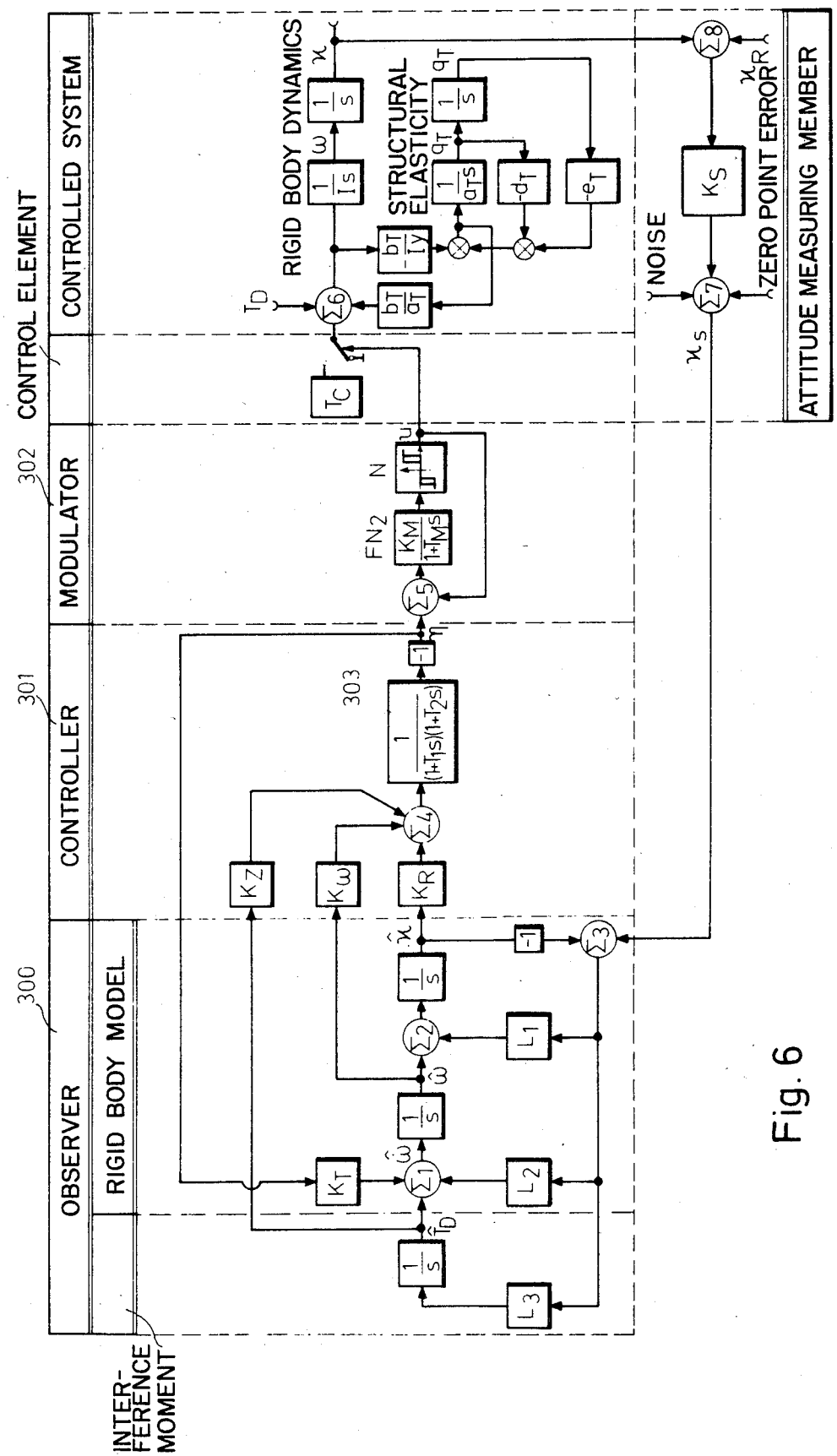
FIG. 6 shows another control loop in accordance with the invention.

In view of this, FIG. 6 shows a control circuit in accordance with another embodiment of the invention which meets the requirements. The measures which, in accordance with the invention, ensure the solution of the control problem reside in that, in comparison to the control circuit according to FIG. 3, instead of the pulse-shaped electrical control signal u for the reaction nozzles at the modulator output, the signal at the modulator input is returned through the mixing factor $K_T$ into the observer 300 and the state controller 301 is expanded by an added filter 303 of at least two additional filters of the first order or one filter of at least the second order, the added filter being located between the summing point of the controller mixing signals $\Sigma_4$ and the modulator input $\Sigma_5$. The first of these measures constitutes a shift of a signal take-off point beyond the high-grade, non-linear modulator circuit with the non-linear relay characteristics N and, thus, changes, as is well known to one of ordinary skill, the behavior of the control circuit in an initially unforeseeable manner. However, it is found that, as a result, freedom in the selection of the controller and observer parameters is substantially increased and the noise level of the signals in the observer is significantly reduced.

The second measure facilitates a separation and individual influencing of the rigid body motion and structural vibration modes. The break-point frequencies of these added filters ($\omega_1 = 1/T_1$ and $\omega_2 = 1/T_2$) are especially chosen in such a way that they are between the natural frequency of the rigid body motion and the lowest natural frequency of the elastic structural vibrations. Since an observer, usually called Kalman filter, already constitutes an optimum filter in the sense of certain criteria of optimization, the use of additional filters in the corresponding state controller is not at all customary and is in contradiction with conventional optimum filter theory, however, it is particularly effective in the present case. The remaining elements of the control circuit according to FIG. 6, such as the controlled system (according to FIG. 4a), attitude measuring element, PWPF modulator, structure of the observer and combination of the estimated state variables in the controller (according to FIG. 3) were already discussed in connection with the respective block diagrams and do not require any further explanations. In the case of a possible conversion of the observer/state controller structure into equivalent transfer functions, it is possible, in the present case, to include also the modulator network in a simple manner and, thus, to transfer, as shown with the aid of FIG. 2, from the PWPF modulator to a pseudorate modulator.

The above-described embodiments of the present invention are equally suitable for meeting the stated control task, i.e., to ensure a high control accuracy even in the case of high external disturbance torques, stability of the structural vibrations inspite of uncertainties in the elasticity parameters and discontinuous control intervention with the lowest possible expenses for realization and consumption of control energy.

In accordance with another embodiment of the invention, it is possible to further reduce the stable vibration amplitudes of the elastic structural components occurring in the respective case of application and, thus, the dynamic structural loads. This is because the structural load increases when the control pulses must come longer and longer in the case of increasing disturbance forces and/or moments for maintaining the state of equilibrium or due to the great resonance peaks of the structural elastic vibrations when, in the already mentioned "critical disturbance torques" the repetition frequency of the control pulses coincides with a resonant frequency.

Therefore, it is proposed in accordance with the invention for reducing the structural loads, particularly in the case of critical disturbance torques, to use the estimated values of the actually occurring disturbance torques $T_D$ determined in the observers according to FIG. 5c or FIG. 6 for the prevention of a resonant excitation. This can be done, for example, thereby that, by an adaptive, automatic intervention in the modulator with increasing magnitude of the disturbance torque signal, the width of the hysteresis characteristics is enlarged and, thus, the duration of the invididual pulse is increased. From the equilibrium condition for the control circuit, it then follows that the repetition frequency of the control pulses decreases. The technical realization of this invention shall be explained later in more detail. As a result of this measure, there occurs the simultaneous achievement that the maximum switching number of control interventions is limited, which favorably influences the reliability of the control elements throughout the desired service life. Particularly if the parameters of this adaptive pulse width control are selected so that the maximum pulse repetition frequencies are always below the lowermost structural resonant frequencies, a resonant excitation cannot occur. However, undesirably high structural vibration amplitudes can still occur due to the large control pulses which may possibly be unavoidable in special applications with high disturbance torque levels.

To also take into account these conditions, it is further proposed in accordance with the invention, to utilize the structural vibration amplitudes actually occurring in the specific case in the system for changing the pulse repetition frequency of the control interventions as soon as the amplitudes exceed a predetermined permissible magnitude. A signal which represents a measure for the structural vibration amplitudes and which can be utilized for this control circuit adaptation, can be obtained, as shall be explained in more detail later, in a simple manner from the output signal of the attitude sensor since the structural vibrations react upon the central body and cause corresponding variations in the deviation.

However, since, in accordance with the above, control pulses which are too large can also contribute to the structure excitation, it is advisable in this case to influence the hysteresis width of the modulator in the sense of reduction, i.e., to increase the pulse repetition frequency and thereby to shift to higher frequencies beyond the structural resonant point.

Special advantages result from a combination of both above-mentioned measures, especially when, by an appropriate selection of the parameters of the two adaptive interventions, the estimated disturbance torque $T_D$ is utilized for limiting the maximum control element switching values and the measured structural vibration amplitudes used for preventing resonant excitations.

The previously given description of the stated control problems and the measures according to the invention for controlling them have exclusively dealt with the operation conditions of such control systems in the stationary condition, i.e., the steady-state condition. However, at the transitions of the mentioned vehicles from other operational phases or at the beginning or the end of commanded attitude changes which are accompanied, for example, by a sudden increase of disturbance forces and moments, rapid changes of the operational conditions occur which, in a known manner, lead to an overshoot of the control system prior to reaching the new desired position or the position of rest. Depending on the severity of the transition conditions, the specified accuracy requirements which can be easily adhered to during the stationary operation, can be momentarily violated during such transition phases. Within the scope of the present invention, solutions have been found also for these cases; the solutions do not completely prevent an overshoot, however, they are able to use the permissible deviations of the system from the desired attitude.

In accordance with the invention, for controlling the problems during dynamic transitions, particularly for reducing the deviations during the transition period, three different measures can be taken which, depending on the case of application, can be used either individually or in combination:

First, the deviation signal from the attitude sensor is used for performing an additional intervention in the relay characteristics of the modulator in such a way that the zero point of the non-linear hysteresis characteristics is shifted in the opposite direction and proprortionally to the magnitude of the measured deviation. This measure has the effect that control pulses of longer duration are triggered immediately which counteract the deviation which builds up. The technical realization will be discussed below in greater detail.

Second, suitable estimated values of state variables in the observer, such as the disturbance torque $T_D$, from the stationary conditions of similar preceding maneuvers are recorded and used, in the case of repetition, for adjusting the initial conditions of the integrators in such a way that the electrical network forming the observer does not go through a transient phase, but that the signal conditions immediately meet the stationary operation requirements.

Third, also from the experience of a similar preceding maneuver, a deviation command of suitable magnitude and opposite sign for the expected deviation is superimposed which, during the duration of the transient, is taken back linearly to the value zero. Alternatively, the integrator in the observer which is responsible for the deviation estimate can be given the full or an appropriate fraction, for example, half, of the expected deviation during the transient phase as the initial condition. As a result of these measures, overshoot, which otherwise proceeds only in the direction of the disturbance, is symmetrically distributed around the deviation zero and its amplitude is cut in half.

In the following, the technical realization of the above-described measures shall be discussed in more detail, with the exception of the two mentioned last; for carrying out the latter, it is merely necessary to give appropriate commands to the control system.

Figure 7:
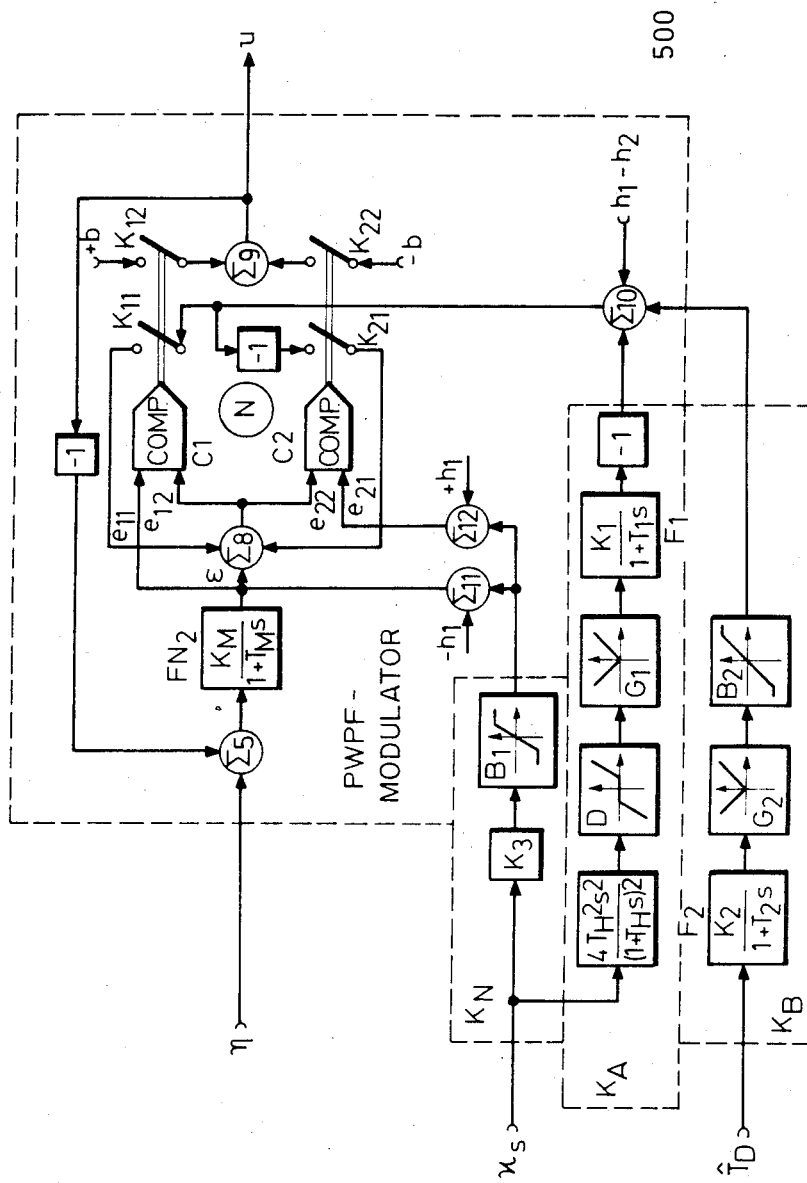
FIG. 7 shows a functional diagram of an adaptive PWPF modulator.

FIG. 7 shows a functional diagram of an adaptive PWPF modulator of the mentioned type. The upper portion shows the normal, non-adaptive PWPF modulator, comprised of the modulator network FN2, the non-linear relay characteristics N and the negative feedback of the output signal u to the summing point $\Sigma_5$ at the input $\eta$. For the realization of the hysteresis characteristics N, two comparators $C_1$, $C_2$, are provided, the upper comparator $C_1$ closing the contacts $K_{11}$, $K_{12}$ connected thereto when the sum of the two inputs of $C_{11}$ becomes positive, while the lower comparator $C_2$ closes when the sum of its inputs becomes negative. Applied to always one of the two comparator inputs $e_{11}$, $e_{21}$ is a fixed value, namely, the hysteresis threshold $-h_1$ at $C_1$, $+h_1$ at $C_2$, and the respective other input $e_{12}$, $e_{22}$ is controlled by the input signal and the hysteresis width $h_1-h_2$. If the input signal $\eta$, e.g., is positive, the controlled input $e_{12}$ of the upper comparator $C_1$ runs up with the time lag of the modulator network FN2 until the amount of the threshold value $-h_1$ is reached and the comparator $C_1$ responds. The resulting closing of the contact $K_{11}$ feeds a signal which corresponds to the hysteresis width $h_1-h_2$ via a summing element $\Sigma_8$ back to the controlled comparator $e_{12}$. By means of the second contact $K_{12}$, the pulse signal b is simultaneously applied via the summing element $\Sigma_9$ to the output u and is substracted from the input signal $\eta$ via the negative feedback in the summing element $\Sigma_5$. Through the modulator network FN2 and the summing element $\Sigma_8$, the (negative) difference $\eta-b$ results in a delayed decrease of the controlled input $e_{12}$ of the comparator $C_1$. The comparator $C_1$ drops off again and, therefore, opens the connected contacts $K_{11}$, $K_{12}$ when the sum of its inputs $-h_1+h_1-h_2+\epsilon$ reaches the value zero. This is the case when the output signal $\epsilon$ of the modulator network FN2 reaches the drop-out threshold $\epsilon=h_2$. Simultaneously, the modulator output signal u falls back to zero and, thus, terminates the control intervention. The procedure is repeated regularly when the input signal $\eta$ remains positive, wherein a constant input signal $\eta$ has as a consequence pulses of constant width and frequency. The same applies accordingly in the case of negative input signals by means of the outer comparator $C_2$ and the corresponding contacts $K_{21}$, $K_{22}$.

The added circuit for realizing the adaptive measures in accordance with the invention which have already been described with respect to their effect are schematically illustrated in the lower portion of FIG. 7 in the parallel branches $K_N$, $K_A$, $K_B$. From the manner of operation of the PWPF modulator, it becomes clear that the desired effects can be achieved in a simple manner by appropriately shifting the response threshold $h_1$ and the drop-out threshold $h_2$.

The first branch $K_N$ serves for reducing the amplitude of overshoot by means of the deviation signal $\chi_s$. Through an amplification factor $K_3$ and a limitation B, the output signal of the measuring element is added in summing elements $\Sigma_{11}$, $\Sigma_{12}$ to the nominal values of the response thresholds $+h_1$, $-h_1$. A positive error signal $\chi_s$ reduces the response threshold $-h_1$ for the positive control intervention which, as a result, takes place earlier than normal. Since the hysteresis width $h_1-h_2$ is thereby not influenced, the drop-out threshold $-h_2$ is shifted by the same amount, which corresponds to a shift of the zero point of the entire non-linear relay characteristics.

In FIG. 7, the branch in the middle shows how the resonant excitations of the elastic vibrations can be avoided by means of measured structural amplitudes. In this case, the high frequency vibrations are filtered out from the deviation signal by means of a high pass filter H, the amplitudes which can be demanded of the structural load and at the occurrence of which an intervention should not yet be effected are determined by a dead zone, impermissibly excessive values are rectified by $G_1$, are smoothed by $F_1$, and are superimposed with the opposite sign in the summing element $\Sigma_{10}$ on the nominal hysteresis width $h_1-h_2$. Accordingly, structural vibration amplitudes which are too great lead to a reduction of the hysteresis width $h_1-h_2$ and consequently, to shorter control pulses and higher repetition frequencies of control interventions. Of course, the structural vibration amplitudes can also be determined by means of other sensors, such as, for example, velocity and acceleration sensors which are either already provided in the equipment of the system for other purposes or can be mounted additionally or exclusively for the purpose at suitable locations.

In the last branch $K_B$ of FIG. 7, the technical realization of the pulse width adjustment by means of the estimated disturbance torque $T_D$ is illustrated. The disturbance torque signal $T_D$ is smoothed in the low pass filter F2 and is superimposed $\Sigma_{10}$ through an modulus forming circuit $G_1$ and a limitation $B_2$ without reversing the sign on the nominal hysteresis width $h_1-h_2$. Thus, increasing disturbance torques $T_D$ result in a widening of the hysteresis $h_1-h_2$, longer control pulses and lower repetition frequencies.

Figure 8:
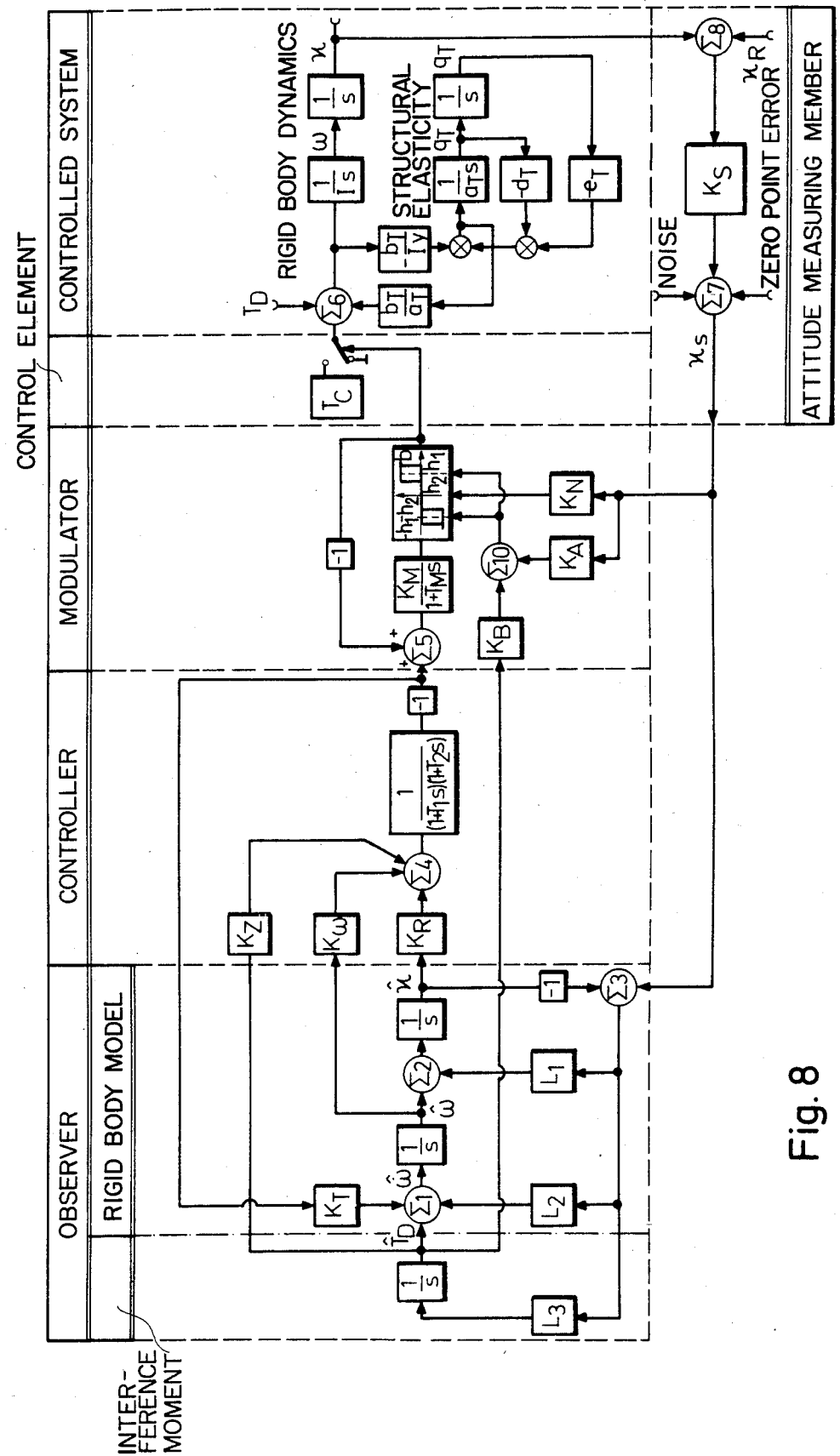
FIG. 8 shows a control loop with observer and multiple-adaptive controller.

FIG. 8 once again shows the control circuit according to FIG. 6 with all the features and added measures in accordance with the invention in a schematic representation in order to illustrate the signal combinations. Of course, the adaptive added measures which are described in detail above and are illustrated in FIG. 8 can be used accordingly either individually or in their totality in the control circuit according to FIG. 5c and exhibit their advantageous effect also in this case. Whether or not they are required either individually or in any combination depends on conditions of the specific application.

In the present description of the invention, particularly the function diagrams of the embodiments, the presentation of the analog circuits was exclusively used. However, digital technology for such technical realization is now used to an increasing extent. Conversion into equivalent digital circuits causes no problem to one of ordinary skill in this art. Particularly, if a digital computer is available aboard for the solution of the control task, this conversion is especially facilitated by the fact that the observer/state controller structure has been predominantly used for the representation, the discrete formulation of this structure being already contained in the above-mentioned basic works of Kalman and also otherwise extensively discussed in the pertinent literature.

Difficulties in digitalizing are only encountered in the simulation of the PWPF modulator circuit because, due to the speed of the internal processes, very high sampling rates of to about 1 kHz must be chosen in order to ensure a function which corresponds to the analog circuit. Despite the simplicity of such a computer program, the high sampling rates lead to a tie-up of a significant portion of the available computing time.

However, within the scope of the present invention, this problem was also solved and a simple possibility was found for avoiding high sampling rates for the digital realization of the control pulse generation and still ensuring a dynamic behavior which is equivalent to the analog modulator circuit. The frequency of the program cycles to be performed per time unit is determined only by the significantly lower sampling rate which is required for the entire control circuit and depends upon the frequencies of the occurring structurally elastic vibrations.

The further development of the invention for the purpose of digital realization of the PWPF modulator is based on the concept of finding an analytical formula for the function of the closed analog modulator loop, which formula can be exactly computed by means of direct computing operations, such as, addition, subtraction, multiplication and division, so that the digital simulation of the fast internal analog processes in the circuit are unnecessary. The significant variables in this connection are the pulse width, pulse frequency and the time of triggering. In addition to an amplification, the modulator network is composed of a delay element with large time constant $T_M$ which, in approximation, is to perform the function of an exact integration which, however, cannot be realized in the analog circuit because of the integrator drift. However, especially for this case of an ideal modulator network with exact integrator, especially simple analytic formulae can be found for the functional variables of the modulator. They are:
For the pulse width:

$$w = \frac{h_1 - h_2}{K_M^* \cdot b} \cdot \frac{1}{\left(1 - \frac{\eta}{b}\right)}$$

For the pulse frequency:

$$f = \frac{K_M^* \cdot b}{h_1 - h_2} \cdot \frac{\eta}{b}\left(1 - \frac{\eta}{b}\right) = \frac{1}{T_p}$$

wherein, corresponding to the denotations of FIG. 8,
$\eta$: modulator input signal
$K_M^x$: amplification of the modulator integrator
$h_1$: response threshold
$h_2$: drop-out threshold
$h_1 - h_2$: hysteresis width
$b$: pulse height
$T_p$: pulse period.

In the digital computer program, the pulse width w is computed from the controller output variable $\eta$ and the known parameters $K_M^x$, $b$, $h_1$, $h_2$; aside from scaling factors, this means a subtraction, a division and a multiplication. This value is once again divided by the input variable $\eta$ normalized for the constant pulse height $b$ and then results in the pulse period, i.e., the time interval between two successive control pulses. These two functional values of the modulator are computed in each sampling interval, the number of sampling periods which have elapsed since the generation of the preceding pulse is subtracted from the computed pulse period and it is decided whether a pulse should be triggered. This is the case when the difference between pulse period and number of elapsed sampling periods is smaller than a sampling interval, namely, the next following sampling interval.

The form according to the invention of the digital realization of the PWPF modulator was tested by means of a computer program in a microprocessor in the closed simulation loop with analog controlled system and has been found fully operational and equivalent to the analog realization.

In view of the equivalency of the PWPF modulator and pseudorate modulator described with the aid of FIG. 2c, the above-explained method of realization simultaneously covers the digital realization of the pseudorate modulator.

While the foregoing description and drawings represent the preferred embodiments of the present invention, it will be obvious to those skilled in the art that various changes and modifications may be made therein without departing from the true spirit and scope of the present invention.

What is claimed is:

1. In an arrangement for the attitude stabilization of flexible vehicles, such as aircraft and spacecraft, which, due to their lightweight construction and/or large spatial extension or their high degree of slenderness, have, structurally, weakly-dampened, bending vibrations and-/or torsional vibrations, and in which, for generating the forces and moments required for stabilization of the vehicle, discontinuously operating actuators are used, the improvement comprising that for each vehicle axis, there are:
   (a) only a single observer means responsive to signals representing attitude measurements for providing signals representing estimated values of the state variables of the vehicle system to be controlled, said observer means having a transfer function of at most third order;
   (b) state controller means, responsive to the observer means, for providing signals for controlling the state variables;
   (c) means, responsive to the state controller means, for modulating the signal produced by the state controller means, said modulating means having a relay characteristic, so that a special modulator network and an internal modulator feedback are eliminated, the modulating means having an output signal which is fed back to the observer means;
   (d) means for supplying a feedback signal from the output of the modulating means to the observer means;
wherein the actuators are responsive to said modulating means and act upon the vehicle with the stabilization forces and moments, respectively, produced by the actuators.

2. In an arrangement for the attitude stabilization of flexible vehicles, such as aircraft and spacecraft, which, due to their lightweight construction and/or large spatial extension or their high degree of slenderness, have, structurally, weakly-dampened, bending vibrations and-/or torsional vibrations, and in which, for generating the forces and moments required for stabilization of the vehicle, discontinuously operating actuators are used, the improvement comprising that for each vehicle axis, there are:
   (a) only a single observer means responsive to signals representing attitude measurements for providing signals representing estimated values of the state variables of the vehicle system to be controlled, said observer means having a transfer function of at most third order;
   (b) state controller means, responsive to the observer means, for providing signals for controlling the state variables;
   (c) means, responsive to the state controller means, for modulating the signal produced by the state controller means, and having a relay characteristic;
   (d) means for supplying a feedback signal from the input of the modulating means to the observer means; and
   (e) a low pass filter at the output side of the state controller means and at the input side of the modulating means, said filter having either a pair of low pass filter sections with first order transfer functions or a single low pass filter section with at least a second order transfer function, the break-point frequencies of the first order transfer functions or second order transfer functions being between the natural resonance frequency for position stabilization and the natural resonant frequency of vibration stabilization for the vehicle axis to be stabilized;
wherein the actuators are responsive to said modulating means and act upon the vehicle with the stabilization forces and moments, respectively, produced by the actuators.

3. In an arrangement for the attitude stabilization of flexible vehicles, such as aircraft and spacecraft, which, due to their lightweight construction and/or large spatial extension or their high degree of slenderness, have, structurally, weakly-dampened, bending vibrations and/or torsional vibrations, and in which, for generating the forces and moments required for stabilization of the vehicle, discontinuously operating actuators are used, the improvement comprising that for each vehicle axis, there are:

(a) a first network having a first transfer function;
 (b) a second network responsive to said first network and having a second transfer function;

said first and second transfer functions corresponding to the linear transfer functions for each vehicle axis of a system comprising:

(1) only a single observer means responsive to signals representing attitude measurements for providing signals representing estimated values of the state variables of the vehicle system to be controlled, said observer means having a transfer function of at most third order;
 (2) state controller means, responsive to the observer means, for providing signals for controlling the state variables;
 (3) means, responsive to the state controller means, for modulating the output signal of the state controller means, having a relay characteristic, so that a special modulator network and an internal modulator network are eliminated; and
 (4) feedback means for supplying a feedback signal from the output of the modulating means to the observer means;

wherein the actuators are responsive to said modulating means and act upon the vehicle with the stabilization forces and moments, respectively, produced by the actuators.

4. The arrangement of claim 3, wherein said second transfer function network is included in a feedback path from the output of the modulating means having a relay characteristic to the input thereof.

5. In an arrangement for the attitude stabilization of flexible vehicles, such as aircraft and spacecraft, which, due to their lightweight construction and/or large spatial extension or their high degree of slenderness, have, structually, weakly-dampened, bending vibrations and/or torsional vibrations, and in which, for generating the forces and moments required for stabilization of the vehicle, discontinuously operating actuators are used, the improvement comprising that for each vehicle axis, there are:

(a) a first network having a first transfer function;
 (b) a second network having a second transfer function, said second network responsive to the output of said first network;

said first and second transfer functions corresponding to the linear transfer functions for each vehicle axis of a system comprising:

(1) only a single observer means responsive to signals representing attitude measurements for providing signals representing estimated values of the state variables of the vehicle system to be controlled, said observer means having a first transfer function of at most third order;
 (2) state controller means, responsive to the observer means, for providing signals for controlling the state variables;
 (3) means, responsive to the state controller means for modulating the signal provided by the state controller means, having a relay characteristic;
 (4) feedback means from the input of the modulating means to the observer means; and
 (5) a low pass filter at the output side of the state controller means and at the input side of the modulating means, said filter having either at least two low pass filter sections with first order transfer functions or a single low pass filter section with at least a second order transfer function, the breakpoint frequencies being between the natural resonance frequency for position stabilization and the natural resonant frequency of vibration stabilization for the vehicle axis to be stabilized;

wherein the actuators are responsive to said modulating means and act upon the vehicle with the stabilization forces and moments, respectively, produced by the actuators.

6. The arrangement of claim 5, wherein said second transfer function network is included in a feedback path from the output of the modulating means having a relay characteristic to the input thereof.

7. An arrangement according to claim 1 or claim 2, wherein said observer means is of the second order and the state controller means has no signal representing a disturbance variable $T_D$ feeding forward.

8. An arrangement according to claim 1 or claim 2, wherein for preventing the excitation of structural resonances, signal means are included for receiving the estimated value of disturbance variable $T_D$ formed in the observer means, said signal means being connected to the modulating means to change the hysteresis width of the relay characteristic thereof in an adaptive manner in such a way that the repetition frequency of the control interventions always remains below a predetermined value of the lowermost structural resonant frequency in the respective vehicle axis.

9. An arrangement according to claim 1 or claim 2, wherein, for reducing overshoot, means, to which said modulating means is responsive, are included for additionally using the deviation signal of the attitude measuring sensor for shifting the zero point of the relay characteristic of the modulating means in an adaptive manner and in the opposite sense, i.e., in such a way that increasing deviation causes decreasing of the threshold response of the modulating means.

10. An arrangement according to claim 1 or claim 2, wherein means, to which said modulating means is responsive, are included for forming, either from the output signal of the attitude measuring element or by an additional measuring device, a signal for the magnitude of the structural vibration amplitude and for using this signal in an adaptive manner when a predetermined threshold value is exceeded for changing the hysteresis width of the relay characteristic of the modulating means in such a way that the repetition frequency of the control interventions does not coincide with a structural resonant frequency but preferably can be shifted toward higher values.

11. An arrangement according to claim 1 or 2, wherein, for reducing overshoot, an integrator included in the observer and providing the disturbance variable estimation signal $T_D$ is set to an initial value, which value to be adjusted corresponds to the estimated value of the disturbance value.

12. An arrangement according to claim 1 or claim 2, wherein, for reducing overshoot, setting means, to which said observer means is responsive, are included for setting an integrator in the observer means for providing the estimation of a deviation x to an initial value which corresponds to about half of the expected overshoot amplitude.

13. An arrangement according to claim 1 or claim 2, wherein, means, to which said observer means is responsive, are included for providing, prior to the beginning of a transition procedure, a deviation command of the opposite sign from the expected deviation in attitude from that estimated, whose value corresponds at the beginning approximately to half the maximum deviation that has occurred in the similar preceding transition procedure and is gradually switched to zero during the transient period.

14. An arrangement according to claim 1 or claim 2, wherein the observer means, controller means and modulating means, and also further adaptive measures and any required initial conditions are realized by an onboard digital computer.

15. An arrangement according to claim 1 or claim 2, wherein:
   (a) said modulating means is an adaptive PWPF modulator comprising a non-adaptive PWPF modulator with a modulator network $FN_2$ having a transfer function, a circuit having non-linear relay characteristics N responsive to the modulator network and negative feedback of the output signal u of the modulator to a summing point $\Sigma_5$ at an input $\eta$ of the modulator;
   (b) said circuit having relay characteristics N of said modulating means comprising two comparators $C_1$, $C_2$ and four sets of contacts $K_{11}$, $K_{12}$, $K_{21}$ and $K_{22}$, comparator $C_1$ for closing the contacts $K_{11}$, $K_{12}$ connected thereto when the sum of the two inputs of the comparator $C_1$ becomes positive, and comparator $C_2$ closing contacts $K_{21}$, $K_{22}$ when the sum of its inputs become negative, comparator $C_1$ having inputs $e_{11}$, $e_{21}$ and comparator $C_2$ having inputs $e_{12}$, $e_{22}$;
   (c) means for supplying a fixed value always to one of the two comparator inputs $e_{11}$, $e_{21}$, i.e., hysteresis threshold $-h_1$ at comparator $C_1$ and hysteresis threshold $+h_1$ at comparator $C_2$, wherein the respectively other inputs $e_{12}$, $e_{22}$ are controlled by the input signal $\eta$ and the hysteresis width $h_1-h_2$; said modulating means operating so that:
   (1) if the input signal $\eta$ is positive, the controlled input $e_{12}$ of comparator $C_1$ includes a delay of the modulator network $FN_2$ until the amount of the threshold value $-h_1$ is reached and the comparator $C_1$ responds, and the resulting closing of the one contact $K_{11}$ results in a signal which corresponds to the hysteresis width $h_1-h_2$ and is fed back via a summing element $\Sigma_8$ to the controlled comparator input $e_{12}$;
   (2) simultaneously, by means of the second contact $K_{12}$ (or $K_{22}$) a pulse signal b $(\eta-b)$ is applied via a summing element $\Sigma_9$ to the modulating means output u and is subtracted from the input signal $\eta$ by way of negative feedback at the summing element $\Sigma_5$;
   (3) the negative difference $\eta-b$ results in a delayed decrease of the controlled input $e_{12}$ of the comparator $C_1$ through the modulator network $FN_2$ and the summing element $\Sigma_8$, and comparator $C_1$ and thereby again drops from a response state to a resting state and, thus, the connected contacts $K_{11}$, $K_{12}$ (or $K_{21}$, $K_{22}$) open when the sum of its inputs $-h_1+h_1-h_2+\epsilon$ reaches the value zero and the modulating means output signal u falls back to zero and thereby terminates the control intervention;
   (4) wherein the operation of (1), (2) and (3) above is repeated regularly as long as the input signal $\eta$ remains positive (or negative), wherein a constant input signal $\eta$ has as a consequence pulses of constant width and frequency.

16. An arrangement according to claim 15, including a first branch circuit KN for reducing the amplitude of overshoot by means of a deviation signal $\chi_s$, representing the measured angular position of the vehicle from the estimated value, which signal is supplied to the first branch, the output signal of the first branch circuit being added in summing elements $\Sigma_{11}$, $\Sigma_{12}$ to the nominal values of the response thresholds $+h_1-h_1$, said first branch circuit including means for amplification having an amplification factor $K_3$ and a limiter $B_1$; when the deviation signal $\chi_s$ is positive, the response threshold $-h_1$ becomes smaller and a shift of the zero point of the entire non-linear relay characteristics occurs.

17. An arrangement according to claim 15, wherein resonant excitations of elastic vibrations are avoided by measuring vibration amplitudes by means for filtering the high frequency vibrations out of a signal $\chi_s$, corresponding to the measured angular position of the vehicle, utilizing a high pass filter H, by means for determining that the amplitudes which can be demanded of the structural load and at the occurrence of which an intervention should not yet be effected by utilizing a dead zone, means for rectifying undue exceedings of vibration amplitudes in a rectifier $G_1$, for smoothing them in a lag filter $F_1$ and for superimposing them with the opposite sign and in a summing element $\Sigma_{10}$ on the nominal hysteresis width $h_1-h_2$ of the modulating means.

18. An arrangement according to claim 16, wherein said arrangement includes means for effecting a pulse width adjustment of said modulating means by use of the estimate disturbance torque $T_D$, including a low pass filter $F_2$ for smoothing the disturbance torque signal $T_D$ and for superimposing the smoothed signal in a summing element $\Sigma_{10}$ without reversal of the sign on the normal hysteresis width $h_1-h_2$ through a modulus forming circuit $G_1$ and a limiter $B_2$.

19. An arrangement according to claim 1 or claim 2, wherein said modulating means includes a PWPF modulator and for the digital realization of said PWPF modulator, means are included for determining the pulse width W according to the following formula:

$$w = \frac{h_1 - h_2}{K_M^* \cdot b} \cdot \frac{1}{\left(1 - \frac{\eta}{b}\right)}$$

and for determining the pulse frequency f according to the formula $$f = \frac{K_M^* \cdot b}{h_1 - h_2} \cdot \frac{\eta}{b}\left(1 - \frac{\eta}{b}\right) = \frac{1}{T_p}$$

wherein
- $\eta$: modulator input signal
- $K_M{}^*$: the amplification of the modulator integrator
- $h_1$: the response threshold
- $h_2$: the drop-out threshold
- $h_1 - h_2$: the hysteresis width
- b: the pulse height $T_P$: the pulse period and wherein said arrangement includes means for computing f and w in each sampling interval and wherein the number of sampling periods which have elapsed since the generation of the preceding pulse is substracted from the computed pulse period and is utilized for determining whether a pulse should be triggered.

* * * * *